F. E. STEVENS.
GAS METER CONNECTING DEVICE.
APPLICATION FILED JULY 8, 1918.

1,298,596.

Patented Mar. 25, 1919.

Inventor
Frank E. Stevens
By Finckel & Finckel
his Attorneys

UNITED STATES PATENT OFFICE.

FRANK E. STEVENS, OF COLUMBUS, OHIO, ASSIGNOR TO THE LATTIMER-STEVENS COMPANY, OF COLUMBUS, OHIO, A CORPORATION OF OHIO.

GAS-METER-CONNECTING DEVICE.

1,298,596.  Specification of Letters Patent.  Patented Mar. 25, 1919.

Application filed July 8, 1918. Serial No. 243,859.

*To all whom it may concern:*

Be it known that I, FRANK E. STEVENS, a citizen of the United States, residing at Columbus, in the county of Franklin and State of Ohio, have invented a certain new and useful Improvement in Gas-Meter-Connecting Devices, of which the following is a specification.

Gas meters are often made of sheet metal soldered together by hand and consequently are not uniform in size and relative arrangement of their members. The terminals of the inlet and outlet pipes to such meters are not uniformly in line and do not always lie in the same plane. Indeed it has been said that no two meters are exactly alike hence to connect such meters with the street and house pipes is troublesome and the meters or pipes are often left in a strained condition resulting sometimes in a rupturing of the meter. Several means to meet these conditions have before been proposed or patented but such means have been more or less complicated and troublesome to operate.

The object of the present invention is an improved and simplified means whereby any distortion in the meter can be easily and quickly compensated for in the hanger.

The invention is embodied in the example herein shown and described, the novel features or combinations being finally claimed.

In the accompanying drawings—

Figure 1:
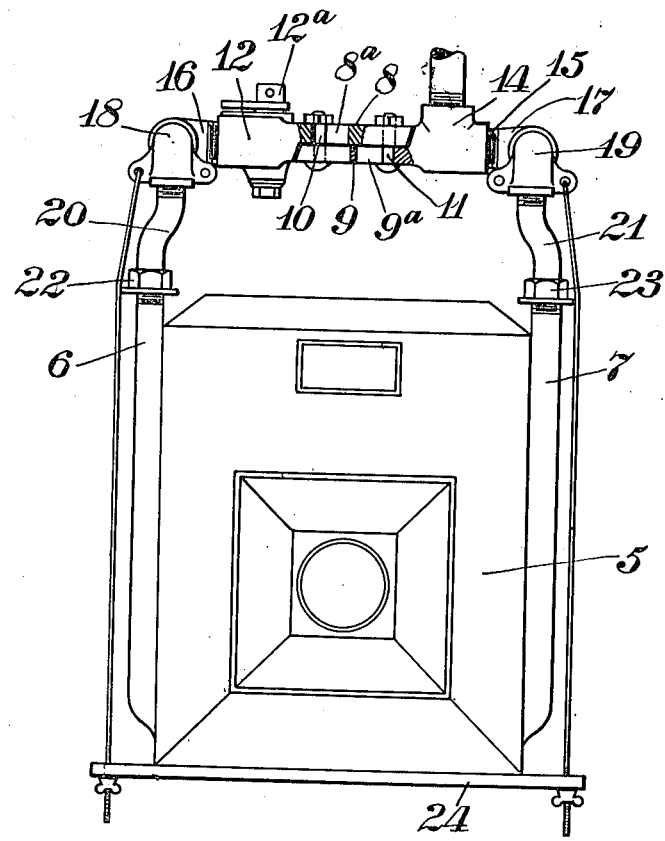
Figure 1 is a front elevation showing an ordinary house meter hung with my improved hanger with parts in section.
Figure 2:
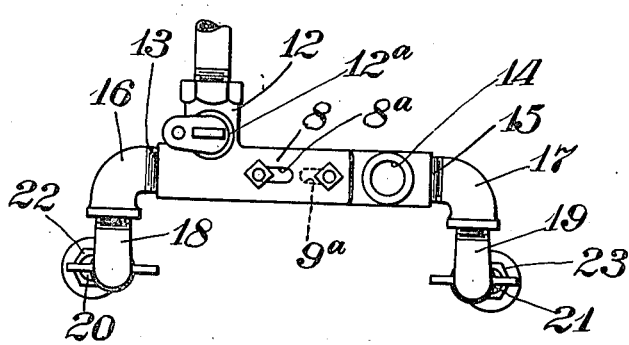
Fig. 2 is a top plan view of the hanger.

In the views 5 designates the meter having inlet and outlet pipes 6 and 7 respectively. The hanger includes bars 8 and 9 lapping on each other, each of said bars being provided with a longitudinal slot as seen at 8ª and 9ª and the two bars provided with bolts, as seen at 10 and 11 repsectively, that are passed through said slots and fixed with nuts to secure the bars in definite adjusted relation to each other.

The bar 8 is provided with a suitable elbow member having an end or portion 12 for connection with the street pipe and a threaded end 13, whose axis alines with the bars to receive another movable elbow as hereinafter described. The portion 12 contains an ordinary valve 12ª for controlling the admission of gas from the street to the meter. The bar 9 is provided with a suitable elbow member having a threaded end 14 for connection with the house piping and another threaded end 15 whose axis alines with the bars to receive another movable elbow as hereinafter described.

16 and 17 are elbows threading into the ends 13 and 15 so that each may rotate on a horizontal axis. The elbows 16 and 17 have internally threaded ends to receive other elbows 18 and 19 respectively so that each may rotate on the axis of the internally threaded end that it engages. The outer ends of the elbows 18 and 19 are internally threaded to receive bent union pipes 20 and 21, said pipes being provided with ordinary threaded coupling nuts 22 and 23 for connecting them with the inlet and outlet pipes 6 and 7.

From the foregoing it will be observed that by reason of the capacity of each of the pairs of elbows at each end of the hanger to be turned on two axes the plane of either of the coupling nuts 22 and 23 can be made to lie in any plane to coincide with the plane of the end of the pipe 6 or 7 as the case may be.

The slots of the bars 8 and 9 permit of major adjustment for different sizes of meter while the bent union pipes 20 and 21 provide for varying distances between the terminal of the pipes 6 and 7.

A shelf bar 24 supported by wire rods connected with eyes on the elbows 18 and 19 can be provided to aid in supporting the meter after the connections described have been effected. Thumb screws on the wire rods serve to adjust the shelf bar to relieve the weight of the meter on the union.

The forms of the parts can be changed without departing from the gist of the invention as claimed.

What I claim is:

1. In combination with a meter and meter hanger structure having a fluid passage, a plurality of elbows having a threaded connection with each other and a threaded connection at one end of the connected elbows with the first mentioned fluid passage and a union connection with the meter at the other end of said connected elbows.

2. In combination with a meter hanger structure having a fluid passage, a plurality of elbows having a threaded connection with each other and a threaded connection at one end of such connected elbows with the first mentioned fluid passage and a union connection with the meter at the other end of such connected elbows, the union pipe of said last named connection being bent, substantially as described.

FRANK E. STEVENS.